United States Patent
Pruessel et al.

[11] Patent Number: 6,070,116
[45] Date of Patent: May 30, 2000

[54] ARRANGEMENT FOR THE ELECTRONIC MONITORING OF AN ADJUSTMENT DRIVE

[75] Inventors: Holger Pruessel, Buehlertal; Patric Kahles, Baden-Baden, both of Germany

[73] Assignee: Robert Bosch GmbH, Germany

[21] Appl. No.: 08/852,604

[22] Filed: May 7, 1997

[30] Foreign Application Priority Data

May 7, 1996 [DE] Germany .......................... 196 18 219

[51] Int. Cl.[7] .................................. F16P 3/00; G05B 9/00
[52] U.S. Cl. ................................ 701/49; 701/29; 318/466
[58] Field of Search .................................. 701/1, 29, 49; 318/466, 467, 470, 479

[56] References Cited

U.S. PATENT DOCUMENTS

| | | | |
|---|---|---|---|
| 4,561,691 | 12/1985 | Kawai et al. ........................... | 296/216 |
| 4,585,981 | 4/1986 | Zintler .................................... | 318/615 |
| 4,746,845 | 5/1988 | Mizuta et al. ......................... | 318/286 |
| 4,870,333 | 9/1989 | Itoh et al. .............................. | 318/286 |
| 5,404,673 | 4/1995 | Takeda et al. ............................ | 49/28 |
| 5,483,133 | 1/1996 | Takabe et al. .......................... | 318/466 |
| 5,689,160 | 11/1997 | Shigematsu et al. .................... | 318/281 |
| 5,701,063 | 12/1997 | Cook et al. ............................. | 318/469 |
| 5,723,959 | 3/1998 | Iwata et al. ............................. | 318/447 |

FOREIGN PATENT DOCUMENTS

| | | |
|---|---|---|
| 0 422 388A1 | 4/1991 | European Pat. Off. . |
| 0 581 509 A1 | 2/1994 | European Pat. Off. . |
| 3 111711 A1 | 10/1982 | Germany . |
| 40 00 730 A1 | 1/1991 | Germany . |
| 44 10 506 A1 | 10/1994 | Germany . |
| 43 16 898 C2 | 3/1995 | Germany . |
| 4326216 C2 | 4/1996 | Germany . |

*Primary Examiner*—Michael J. Zanelli
*Attorney, Agent, or Firm*—Venable; George Spencer; Norman N. Kunitz

[57] ABSTRACT

An arrangement and method for the electronic monitoring of an adjustment drive wherein two criteria must be met before a jamming safety responds. The one criterium takes into account the curve for the rotational speed of the actual and a preceding operation of the adjustment drive while a first and/or second derivative of measured value for the adjustment drive are incorporated into the second criterium.

15 Claims, 1 Drawing Sheet

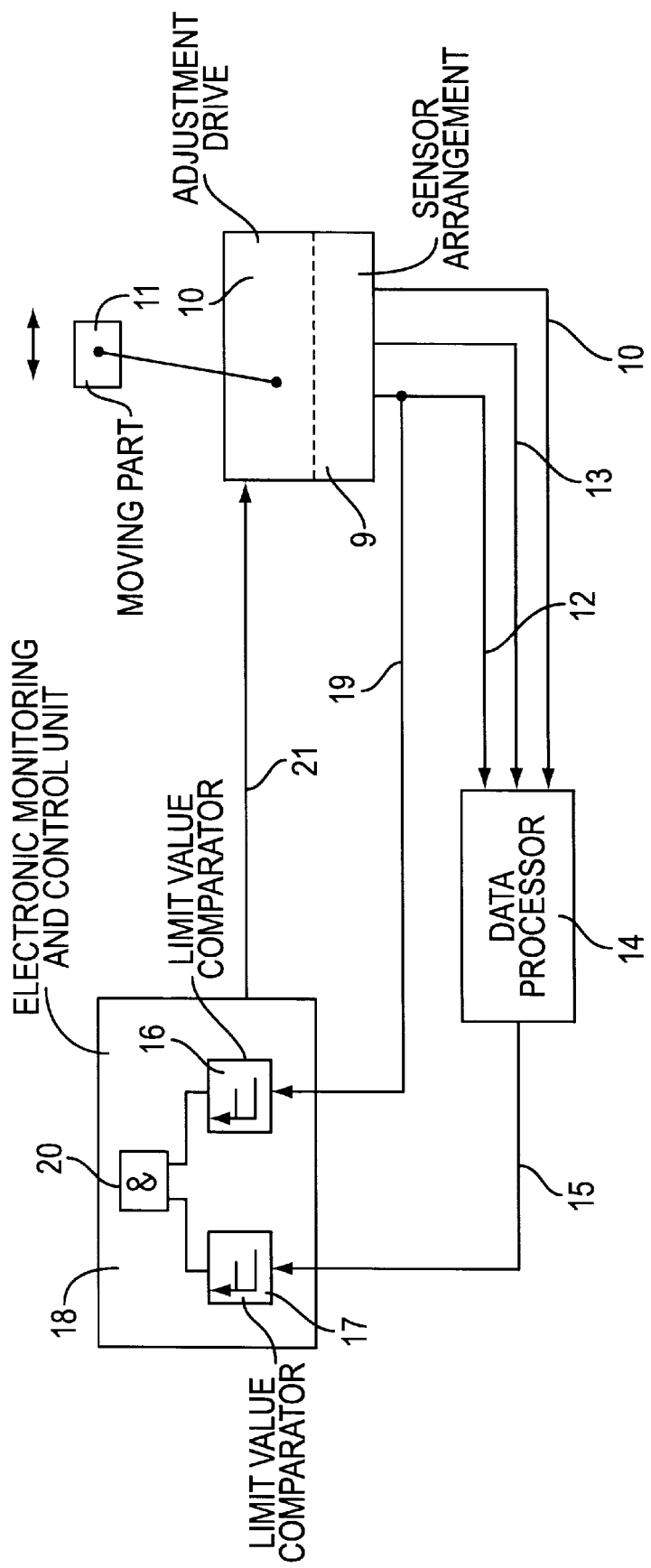
FIGURE

ARRANGEMENT FOR THE ELECTRONIC MONITORING OF AN ADJUSTMENT DRIVE

REFERENCE TO RELATED APPLICATIONS

This application claims the priority of German Patent application No. 1 96 18 219.0-32, filed May 7, 1996, which is incorporated herein by reference.

BACKGROUND OF THE INVENTION

The invention relates to a arrangement and method for the electronic monitoring of an adjustment drive From the European published Patent Application EP-A 0 422 388, a switching device is known for the electromotive operation of closing components in motor vehicles, and for which a historical contemplation of curve and behavior of the first derivative of the moment of rotation is made. With this, it is possible to distinguish between a jamming of the closing component and changes in the rotational moment, which are caused by stick-slip effects. Fluctuations in the main supply voltage are taken into consideration in that rotational speed/rotational moment families of characteristics that depend on the operating voltage enter into the limit value formation.

The subject-matter of German published patent application DE-A 31 11 711 is a device to prevent the jamming of automatically operated doors or windows, particularly on vehicles. For this, the time intervals, determined at certain positions during the preceding closing or opening operation, are compared to the time intervals of the actual operation, which are determined in the same way. If there are significant deviations, then a jamming must be assumed. Changes in the time intervals based on a supply voltage fluctuation are not detected separately in this case.

SUMMARY AND ADVANTAGES OF THE INVENTION

It is the object of the present invention to provide a device and method for reducing the faulty activation probability of a closing force limitation.

The above object is achieved according to a first aspect of the invention by an arrangement for the electronic monitoring of an adjustment drive comprising: at least one sensor providing output signals corresponding to a momentary position of a part moved by the adjustment drive to a position-related measured value for the rotational speed of the adjustment drive, and to a position-related measured value for the supply voltage for the adjustment drive; a data processor which receives the output signals from the sensor and produces a position related calculated output value determined from the curve of at least one of the first and the second derivative of at least one of the measured values of the adjustment drive; and a monitoring device for detecting a jamming of the part, with the monitoring device including a first comparator for comparing the position-related measured value for the rotational speed with a first limit value formed from the position-related value for the rotational speed of an earlier operation of the adjustment drive provided with a tolerance range and for providing an output signal if the first threshold value is exceeded, a second comparator for comparing the position-related calculated value with a second limit value and for providing an output signal if the calculated value deviates from the second threshold value, and means for detecting a jamming of the part if both of the comparators produce a respective output signal.

The above object is achieved according to a further aspect of the invention by a method for electronically monitoring an adjustment drive comprising: providing output signals corresponding to a momentary position of a part moved by the adjustment drive, to a position-related measured value for the rotational speed of the adjustment drive and to a position-related measured value for the supply voltage for the adjustment drive; producing a position-related calculated output value from the curve of at least one of the first and the second derivatives of at least one of the measured values of the adjustment drive; comparing the position-related measured value for the rotational speed with a first limit value formed from the position-related value for the rotational speed of an earlier operation of the adjustment drive provided with a tolerance range, and providing a first output signal if the first threshold value is exceeded; comparing the position-related calculated value with a second limit value and providing a second output signal if the calculated value deviates from the second threshold value; and, detecting a jamming of the part if both of the first and second output signals are present.

On the one hand, faulty activations occur with changes in the rotational speed, resulting from supply voltage and load conditions. The invention for electronically monitoring an adjustment drive has the advantage of reducing faulty activations of the closing force limitation, especially if they are caused by supply voltage fluctuations and different mechanical load curves. If the functional connection between the supply voltage and the rotational speed for the adjustment drive is taken into consideration directly with a parameter system, then a high storage capacity is required. The invention makes allowance for the supply voltage in that two criteria must be met simultaneously to detect a jamming condition. By using an evaluation strategy that is based upon the combination of absolute measured values and relative measured values, it is possible to use the advantages of the evaluation strategy based on absolute measurements. These advantages consist in that the expected load curve for the adjustment drive is anticipated without extensive processing of the measured values and that this load curve is based Oh the limit value for the closing force limitation. As a result of this, particularly changes in the rotational speed during a start-up operation no longer cause faulty activations of the closing force limitation.

In a suitable modification of the invention, a scaling factor, which depends on the supply voltage, takes into account the effect of the supply voltage on the rotational speed during the evaluation strategy that is based on relative measured values. In another advantageous modification, the above object can also be achieved in that a jamming safety responds only if the supply voltage changes only slightly while the evaluation strategy that is based on the absolute measured values detects a breakdown in the rotational speed that is not typical for the load. For a large fluctuation of the supply voltage, fluctuations in the rotational speed do not trigger the jamming safety.

A particularly useful feature of the invention takes into account the preceding load curve in that the calculated value for an earlier operation of the adjustment drive is made available as the starting value for the actual present operation.

Another inventive modification combines the respective, specific advantages by combining both evaluation strategies and taking into account the load—as well as the operating-voltage dependence on the rotational speed.

The invention for an electronic monitoring of an adjustment drive is preferably used with adjustment drives for window openers and sunroofs, e.g., on vehicles.

Additional advantageous features and modifications, follow from the detailed description provided below.

BRIEF DESCRIPTION OF THE DRAWINGS

The FIGURE is a schematic block diagram of an exemplary embodiment of the inventive device or arrangement according to the invention.

DETAILED DESCRIPTION OF THE PREFERRED EMBODIMENT

Turning now to the FIGURE, there is shown an adjustment drive 1a which moves a part 11 and which includes at least one sensor or sensor arrangement 9 for providing certain measured values to a data processor 14. In particular, the data processor 14 receives a position-related value for a rotational speed of the adjustment drive on a data line 10, a position-related measured value for a position of the part 11 an a data line 19, and a position-related measured value for a supply voltage for the adjustment drive on a data line 13. The data processor 14 uses the measured values received via the lines 12,13 and 19 to produce a calculated value on an output line 15. This calculated value is fed to a comparator 17 wherein it is compared to a first given limit value. The position-related quantity for the rotational speed on line 12 is fed via a further data line 19 to a further comparator 16 wherein it is compared to a second given limit value. If both limit values are exceeded, the respective comparators 16 and 17 produce respective output signals which are detected by an AND-gate 20 causing an electronic control unit 18 to assume that part 11 is jammed and to initiate a stopping or reversing of the adjustment drive 10 via the control line 21. It should be understood that although the electronic control unit 18 is shown with separate blocks for the various components 16–18, the corresponding functions could be carried out by other means, e.g., by a microprocessor.

The arrangement shown in the FIGURE operates as follows:

An incremental distance or movement signal is used in a known manner to detect the position of part 11. A counter (not shown) in the sensor arrangement 9 increments or decrements, depending on the rotational direction of the adjustment drive 10 and the incremental distance signal. The incremental distance signal is generated, for example, through a Hall sensor arrangement (not shown) in the sensor arrangement 9. A binary output signal from the Hall sensor arrangement changes its position if the polarity of the magnetic ring for the adjustment drive 10 changes. For a two-pole magnetic ring, the sensor signal edge change always occurs for the same magnetic ring positions, for example, for a rotational angle of 0° and of 180°. With this, the position of the part 11 can be determined exactly to 180°.

The edge change of the Hall sensor signal at the position $x_0$ represents the point in time when a time function element is started to maintain the position-related value of the rotational speed of adjustment drive 10. The time function element is stopped, following a defined number of edge changes, at the position $x_1$. It is useful if this number of edge changes remains constant for all opening and closing operations. This results in equidistant supporting points $x_0$,0 $x_1$, $x_2$, . . . $x_n$. The determined length of time $t_1$ between the positions $x_0$ and $x_1$ is a reciprocal, position-related value for the rotational speed $n_1$. Analogously, the rotational speeds $n_2$ or $n_n$ are calculated from the time interval $t_2$ or $t_n$, which the magnetic ring needs to move from the position $x_1$ or $x_{n-1}$ to the position $x_2$ or $x_n$.

As a result of the position-related evaluation strategies for the jamming safety, it is advisable to make a position-related determination of the supply voltage. At the positions $x_0$, $x_1$ . . . $x_n$, for example, the battery voltage in a motor vehicle is measured and is made available as $U_0$, $U_1$ . . . $U_n$ for a relative evaluation strategy.

The invention combines two criteria, which must both be met so that counter measures are taken, e.g., a reversal or stopping of the adjustment drive 10. These criteria are position-related, meaning for each position $x_0$, $x_1$ . . . $x_n$, a renewed check of both criteria takes place.

For all embodiments of the invention, criterium 1 must be present as a precondition for detecting the jamming of A part 11. For this, each position-related value for the rotational speed on lines 12 and 19 ($n_1$, $n_2$, . . . $n_n$) is constantly monitored in comparator 16 to determine whether it exceeds the second limit value. The second limit value provided in comparator 16 if formed position-related from the position-related rotational speed ($n_1$, $n_2$, . . . $n_n$) of an earlier operation of the adjustment drive. This earlier operation could, for example, always be the preceding one if no jamming is present, or an earlier reference operation. For the limit value of comparator 16, the position-related value for the rotational speed of the earlier operation is provided with a fixed tolerance range, e.g., fluctuations of 20% could be permissible for the position-related value for the rotational speed. This results in a position-related second limit value for comparator 16 ($g_1$, $g_2$, . . . $g_n$). For all n positions, the position-related value of the rotational speed $n_n$ of the actual operation is checked with the second limit value $g_{in}$ comparator 16. If, for example, the condition $n_n < g_n$ is met for a position n, that is if the actual position-related value for the rotational speed $n_n$ at the position n falls by 20% below the rotational speed for the earlier operation at the same position n—according to the example—then the criterium 1 is met for detecting a jamming condition. This ensures that different, position-related load curves, which lead to changes in the rotational speed, do not cause an activation of the jamming safety, as long as they do not exceed the tolerance range. Criterium 1 thus is based on absolute measured values, for which the level depends, among other things on the value of the supply voltage for the adjustment drive.

For criterium 2, on the other hand, the calculated value produced by the data processor 14 on line 15 is based on relative changes in the position-related value for the rotational speed on line 12 or in the position related value of the supply voltage on line 13.

The calculated value on line 15 of an advantageous embodiment of the invention is determined by the data processor 14 from the curve for the first and/or second derivative of the position-related value for the rotational speed on line 12. The derivative occurs based on the position of the part 11. Since no continuous rotational speed function is available, an algorithmic determination of the derivative is needed, for example, via differential quotients. By using, for example, a simple reverse differential quotient, the value for the first derivative of the position-related value for the rotational speed $dn/dx$ ($dn_n$) on line 12 is calculated for the position T to be $(n_n - n_{n-1})/(x_n - x_{n-1})$, wherein the denominator for all rotational speeds assumes the same value because of the equidistant positions and is therefore no longer viewed separately. If the same algorithm is used as basis for the second derivative, then the second derivative of the position-related value for the rotational speed ($d^2 n_n$) is determined at the positions n to be $(n_n - 2n_{n-1} + n_{n-2})/(x_n - x_{n-1})$. The first derivative specifies by which amount the actual rotational speed $n_n$ has changed as compared to the previous rotational speed value $n_{n-1}$.

In accordance with one embodiment of the invention, the calculated value on line 15 is obtained, in principle, in that a position-related value of the first derivative of the rotational speed is added continuously for each position to the previous value, meaning the calculated value on line 15 contains a deviation in the rotational speed with respect to the initial position. For each position n, it is checked whether the deviation in the rotational speed determined in this way exceeds the first limit value in comparator 17 that is fixed for all positions. If the last calculated value on line 15 of the previous operation is used as basis for the initial value, then the previous history of the system is taken into consideration.

In order to give more weight to actual measured values than to previous ones, it is advisable that the calculated value on line 15 is reduced if no changes in the rotational speed occur, since it is realistic not to assume a jamming with a relatively constant rotational speed. That is why only a relatively high breakdown in the rotational speed indicates a jamming. The faulty activation probability is reduced with this strategy with a decrease in the value of the supply voltage. If the position-related value of the second derivative of the rotational speed is actively considered in the calculated value, the same way as the first derivative, then this results in a stronger weighing of a rotational speed breakdown if it is associated with a relatively high change in the rotational speed. An abrupt change in the rotational speed would in this case be given more weight than a constant change in the rotational speed. A weighing factor with respect to the type of derivative permits a flexible adaptation to the respective load curve. One advantageous embodiment provides for a scaling factor which influences the calculated value in dependence on the value of the supply voltage.

The calculated value according to another advantageous modification reverts back to the first and/or the second derivative of the curve for the supply voltage. Analogous to the action described for the rotational speed, a position-related value is calculated for the derivatives of the position related values of the supply voltage 13. The position-related voltage changes are summed up and are used to back up the calculated value on line 15. This calculated value is compared to a first limit value in comparator 17, selected differently as compared to the above, to determine whether a voltage fluctuation did not lead to an exceeding of the first limit value. If this is not the case, then criterium 2 is met. This ensures that a breakdown of the rotational speed does not result from a change in the supply voltage. If criterium 1 is met in addition to criterium 2, then the jamming safety responds.

Using the derivatives of the rotational speed and the supply voltage to determine the calculated value makes it possible to further refine the strategies for an activation of the jamming safety.

According to the invention, criteria 1 and 2 must both be met, so that the electronic control unit 18 detects a jamming of the part 11 and transmits a stopping or reversing signal to the adjustment drive 10 via the line 21.

The invention for the electronic monitoring of an adjustment drive is preferably used for electrical adjustment drives for window openers or sunroofs in motor vehicles.

The invention now being fully described, it will be apparent to one of ordinary skill in the art that any changes and modifications can be made thereto without departing from the spirit or scope of the invention as set forth herein.

What is claimed:

1. Arrangement for the electronic monitoring of an adjustment drive comprising in combination:

at least one sensor providing output signals corresponding to a momentary position of a part moved by the adjustment drive, to a position-related measured value for the rotational speed of the adjustment drive, and to a position related measured value for the supply voltage for the adjustment drive;

a data processor which receives the output signals from the sensor and produces a position related calculated output value determined from the curve of at least one if the first and the second derivative of at least one of the measured values of the adjustment drive; and, an electronic control unit for detecting a jamming of the part, said electronic control unit including a first comparator for comparing the position-related measured value for the rotational speed with a first limit value formed from the position-related value for the rotational speed of an earlier operation of the adjustment drive provided with a tolerance range and for providing an output signal if the first limit value is exceeded, a second comparator for comparing the position-related calculated value with a second limit value and for providing an output signal if the calculated value deviates from the second limit value, and means for detecting a jamming of the part if both of the comparators produce a respective output signal.

2. An arrangement according to claim 1, wherein said data processor determines the calculated value from the curve for at least one of the first and the second derivatives of the position-related measured values for the rotational speed of the adjustment drive.

3. An arrangement according to claim 2, wherein said data processor determines the calculated value from the curve for at least one of the first and the second derivatives of the position-related measured value for the rotational speed of the adjustment drive and a scaling factor which depends on the supply voltage.

4. An arrangement according to claim 1, wherein said data processor determines the calculated value from the curve for at least one of the first and the second derivatives of the position-related measured value for the supply voltage for the adjustment drive.

5. An arrangement according to claim 1, wherein said data processor determines the calculated value from the curve for at least one of the first and the second derivatives of the position-related measured value of the rotational speed and the position-related measured value of the supply voltage of the adjustment drive.

6. An arrangement according to claim 1 wherein the data processor uses a calculated value from an earlier calculated value.

7. An arrangement according to claim 1 wherein the adjustment drive is a drive for a sunroof.

8. An arrangement according to claim 1 wherein the adjustment drive is a drive for a window opener.

9. A method for electronically monitoring an adjustment drive comprising the steps of:

providing output signals corresponding to a momentary an position of a part moved by the adjustment drive, to a position-related measured value for the rotational speed of the adjustment drive, and to a position-related measured value for the supply voltage for the adjustment drive;

producing a position-related calculated output value from the curve of at least one of the first and the second derivatives of at least one of the measured values of the adjustment drive;

comparing the position-related measured value for the rotational speed with a first limit value formed from the position-related value for the rotational speed of an earlier operation of the adjustment drive provided with a tolerance range, and providing a first output signal if the first limit value is exceeded;

comparing the position-related calculated value with a second limit value and providing a second output signal if the calculated value deviates from the second limit value; and, detecting a jamming of the part if both of the first and second output signals are present.

10. A method according to claim 9, wherein the step of producing includes determining the calculated value from the curve for at least one of the first and the second derivatives of the position-related measured values for the rotational speed of the adjustment drive.

11. A method according to claim 10, wherein the step of producing includes determining the calculated value from the curve for at least one of the first and the second derivatives of the position-related measured value for the rotational speed of the adjustment drive and a scaling factor which depends on the supply voltage.

12. A method according to claim 10, wherein the step of producing includes determining the calculated value from the curve for at least one of the first and the second derivatives of the position-related measured value for the supply voltage for the adjustment drive.

13. A method according to claim 9, wherein the step of producing includes determining the calculated value from the curve for at least one of the first and the second derivatives of the position-related measured value of the rotational speed and the position-related measured value of the supply voltage of the adjustment drive.

14. A method according to claim 9 wherein the step of producing includes using a calculated value from an earlier operation of the adjustment drive as an initial value for the calculated value.

15. A method according to claim 9 wherein the step of detecting includes providing a control signal for causing one of reversal and stopping the adjustment drive.

* * * * *